(No Model.)
C. BENDER & C. G. S. MUELLER.
ANTIFRICTION BEARING.
No. 574,472. Patented Jan. 5, 1897.
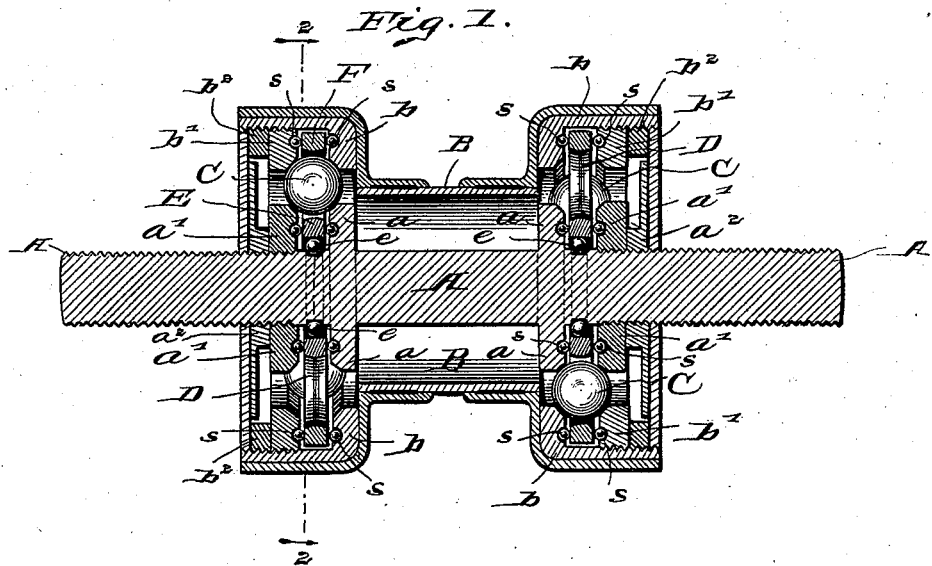
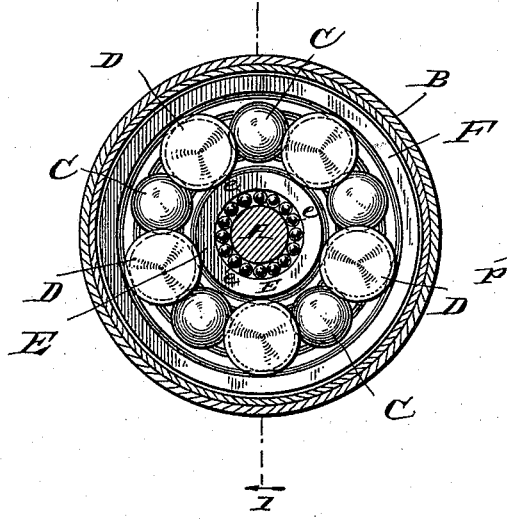
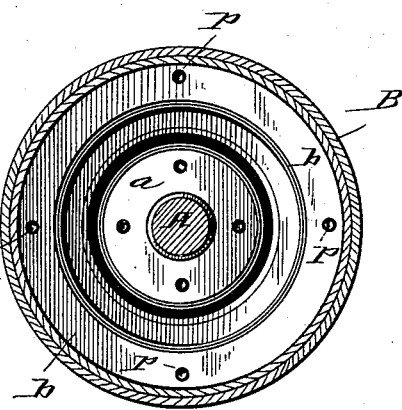
WITNESSES:
INVENTORS,
Conrad Bender
Charles G. S. Mueller,
BY
Chester Bradford,
ATTORNEY.

UNITED STATES PATENT OFFICE.

CONRAD BENDER AND CHARLES G. S. MUELLER, OF INDIANAPOLIS, INDIANA.

ANTIFRICTION-BEARING.

SPECIFICATION forming part of Letters Patent No. 574,472, dated January 5, 1897.

Application filed November 3, 1896. Serial No. 610,910. (No model.)

*To all whom it may concern:*

Be it known that we, CONRAD BENDER and CHARLES G. S. MUELLER, citizens of the United States, residing at Indianapolis, in the county of Marion and State of Indiana, have invented certain new and useful Improvements in Antifriction-Bearings, of which the following is a specification.

The object of our said invention is to produce a ball-bearing wherein friction shall be reduced to a minimum.

Said invention consists in combining with the usual balls certain disks and rings in such a manner that all surfaces which take any considerable portion of the weight shall be revolving into contact with each other, entirely obviating on such surfaces any of the usual friction consequent upon the surfaces moving in opposite directions, all as will be hereinafter more particularly described and claimed.

Referring to the accompanying drawings, which are made a part hereof, and on which similar letters of reference indicate similar parts, Figure 1 is a longitudinal sectional view on the dotted line 1 1 in Fig. 2 of a bearing embodying our said invention; Fig. 2, a transverse sectional view as seen from the dotted line 2 2 in Fig. 1 when looking in the direction indicated by the arrows; and Fig. 3, a similar view to Fig. 2, with the balls, disks, and rings removed, showing the interior surfaces as they appear before said balls, disks, and rings are inserted.

In said drawings the portions marked A represent an axle; B, a hub in the form of a casing surrounding said axle; C, the balls, which carry the load; D, the intermediate disks, and E and F rings between which said disks are placed.

The axle A, as is usual in ball-bearings, carries the inner bearings for the balls, forming part of the ball-races, usually denominated "cones." There are two of these cones at each end, one, $a$, being formed integrally with or secured to said shaft and the other, $a'$, being centrally perforated and screw-threaded, both for convenience in adjustment and ease in assembling the parts, the portions of the shaft upon which said cones are mounted being correspondingly screw-threaded, as shown.

The hub B is or may be of any ordinary or desired form. It is shown as reduced in size centrally for the purpose of reducing somewhat its weight and bulk, and is composed of a central section of tube with hub-like portions secured thereon and extending outwardly therefrom to a sufficient size to receive the mechanism of the bearing and thence in a plane parallel with the center to the ends. It will be understood, of course, however, that this construction may be varied as may be desired. The larger or end portions of this hub B contain the outer halves of the ball races or cones, and these, like those upon the shaft A, are two in number, the inner ones $b$ being forced to position in such a manner as to be held stationary with the surrounding casing and the outer ones $b'$ being screw-threaded exteriorly, both so they may be conveniently adjusted and that they may be assembled with the other parts easily. In the construction shown the cones $b$ have flanges which extend to the extreme ends of the bearing structure, and these are interiorly screw-threaded to receive and carry the outer cones $b'$. When these outer cones are all in place, lock-nuts $a^2$ and $b^2$ are driven in after them, whereby they are securely locked in position.

The balls C are in themselves ordinary balls and rest in the ball-races formed by the cones $a\ a'\ b\ b'$, and carry the hub B upon the axle A in substantially a usual and well-known manner, except that in our construction the balls are somewhat larger in diameter than are commonly used in bearings of corresponding size, while they are fewer in number, as a portion of the space ordinarily occupied by balls is occupied by the disks D.

The disks D are arranged between the balls C and serve to separate said balls and prevent them from rubbing against each other as the parts revolve. Obviously as the balls revolve in one direction the disks (which are driven thereby) are driven in the other direction, said disks being substantially independent of any contact with the other working parts. That said disks may better subserve their purpose and remain more easily in place the peripheries thereof are grooved or concaved somewhat, as indicated in the drawings.

The rings E and F form tracks for the disks D, one interior and the other exterior thereof, and they serve to hold said disks in place, as will be readily understood. Said disks are intended to run as free from contact with other parts as is possible and in no case carry much weight or are subjected to much strain. Nevertheless, to insure that they shall maintain exactly the desired position, small balls $e$ are interposed between the inner ring E and the axle, and the axle is grooved slightly at the point where said balls rest for the purpose of retaining said balls exactly in place. These balls $e$ receive whatever strain may come upon the rings, and thus not only is the structure as a whole, consisting of the disks D and rings E and F, maintained in place, but friction is reduced to a minimum. Ordinarily said rings will not have any particular tendency to be thrown sidewise, so as to come in contact with the cones; but for the purpose of insuring against any such contact, in case especially of a sudden sidewise strain upon the structure, the several cones have a small number of pockets $p$, (in Fig. 3 four such pockets are shown,) in which are placed a corresponding number of small balls $s$, which project out of said pockets slightly and which thus are in position to support the rings from either direction when required. As before stated, under ordinary conditions the rings will run perfectly free, and so, generally speaking, these last-named balls will not be much in service.

Having thus fully described our said invention, what we claim as new, and desire to secure by Letters Patent, is—

1. The combination, in a ball-bearing, of the axle, a surrounding hub, suitable ball-races composed of cones secured to said axle and to said hub, balls in said ball-races, disks between the respective balls, and rings forming tracks for said disks.

2. The combination, in a ball-bearing, of the axle, the hub, ball-races formed on said axle and said hub, balls in said ball-races, disks interposed between the balls, rings forming tracks for said disks, and balls interposed between the inner ring and the axle, substantially as shown and described.

3. The combination, in a ball-bearing, of the axle, the hub, ball-races carried thereby, balls in said ball-races, disks between said balls, rings forming tracks for said disks, and small balls seated in sockets in the parts of the structure alongside said rings, whereby frictional contact between said rings and said structure parts is prevented, substantially as shown and described.

4. The combination, in a ball-bearing, with the balls thereof, of interposed disks carried by independent tracks, whereby frictional contact between the balls themselves is prevented, and said tracks, substantially as and for the purposes set forth.

In witness whereof we have hereunto set our hands and seals, at Indianapolis, Indiana, this 29th day of October, A. D. 1896.

CONRAD BENDER. [L. S.]
CHARLES G. S. MUELLER. [L. S.]

Witnesses:
CHESTER BRADFORD,
JAMES A. WALSH.